United States Patent [19]

Tar et al.

[11] Patent Number: 5,535,850

[45] Date of Patent: Jul. 16, 1996

[54] DRIVEN AXLE ASSEMBLY FOR VEHICLES WITH A LUBRICANT CIRCULATION SYSTEM

[75] Inventors: Lóránt Tar; László Légmán; Iibor Végh, all of Györ, Hungary

[73] Assignee: Raba Magyar Vagon-es Gepgyar Rt., Gyor, Hungary

[21] Appl. No.: 393,264

[22] Filed: Feb. 23, 1995

[30] Foreign Application Priority Data

Feb. 24, 1994 [HU] Hungary ............................... 94 00536

[51] Int. Cl.$^6$ ........................................................ F01M 9/00
[52] U.S. Cl. ........................ 184/6.12; 184/6.22; 184/27.1; 475/160
[58] Field of Search ................................. 184/6.12, 6.22, 184/27.1, 104.1; 74/467; 475/160

[56] References Cited

U.S. PATENT DOCUMENTS

| | | | |
|---|---|---|---|
| 2,840,186 | 6/1958 | Nyland | 184/6.12 |
| 2,908,351 | 10/1959 | Daley, Jr. | 184/6.12 |
| 3,097,546 | 7/1963 | Kelbel et al. | 184/6.12 |
| 3,131,582 | 5/1964 | Kelbel | 184/6.12 |
| 3,762,503 | 10/1973 | Wilder et al. | 184/6.12 |
| 4,352,301 | 10/1982 | Fleury | 74/467 |
| 4,656,885 | 4/1987 | Hori et al. | 475/160 |
| 4,730,514 | 3/1988 | Shikata et al. | 475/160 |
| 4,737,089 | 4/1988 | Tar et al. | 418/64 |
| 5,316,106 | 5/1994 | Baedke et al. | 74/467 |

FOREIGN PATENT DOCUMENTS 624970  6/1949  United Kingdom .................. 184/6.12

Primary Examiner—Thomas E. Denion
Attorney, Agent, or Firm—Young & Thompson

[57] ABSTRACT

A driven axle assembly for vehicles has a lubricant circulation system, and the axle assembly comprises an axle housing with a main drive and a lubricant liquid in its inside, hollow axle casings fixed to both sides of the axle housing, a hollow wheel hub rotatably connected to each axle housing, the wheel hub having a flange for carrying a vehicle wheel rim as well as, in its inside, a planetary gearing and a multi-plate friction type wet brake, the main drive and the planetary gearing as well as the multi-plate wet brake being interconnected with a drive shaft on both sides of the main drive, respectively, and mechanism for making a lubricant flow within the axle assembly. The improvement achieved by this invention is that the mechanism for lubricant liquid flow is a rotatably driven lubricant liquid pump, which is connected with its inlet opening to the lubricant liquid in the axle housing and with its outlet opening to piping forcing the lubricant liquid to the planetary gearing and the multi-plate wet brake, further, the lubricant liquid pump is an eccentric pump with lock valve being arranged around the drive shaft, and an eccentric portion of the pump is in a torque transmitting connection to the drive shaft, and the outlet opening of the liquid pump communicates with a pressure duct provided around the drive shaft in a concentric manner. Therefore, the lubricating and, mainly, the cooling effect within the drives is considerably increased.

9 Claims, 4 Drawing Sheets

DRIVEN AXLE ASSEMBLY FOR VEHICLES WITH A LUBRICANT CIRCULATION SYSTEM

BACKGROUND OF THE INVENTION

1. Field of the Invention

The invention relates to a driven axle assembly with a lubricant circulation system, wherein the axle assembly comprises:

- an axle housing with a main drive and a lubricant liquid in its inside,
- hollow axle casings fixed to both sides of the axle housing,
- a hollow wheel hub rotatably connected to each axle housing, the wheel hub having a flange for carrying a vehicle wheel rim as well as, in its inside, a planetary gearing and, preferably, a multi-plate friction type wet brake, the main drive and the planetary gearing as well as the multi-plate wet brake being interconnected with a drive shaft on both sides of the main drive, respectively, and
- means for making a lubricant liquid flow within the axle assembly.

2. Description of the Related Art

In driven axle assemblies of heavy duty vehicles such as muckshifters, mining machines, agricultural power machines and vehicles for handling and transporting materials, there are to basic tasks to be solved by the applied lubricant circulation system: first, to provide sufficient lubrication under all operational conditions and, second, to avoid overheating of the constructional parts within the axle assembly.

The driven axle assemblies of vehicles as mentioned above, however, comprise more than one drive gear unit with quite complicated and sophisticated gearing mechanisms as well as multi-plate brake units. In the rule, two side drives are arranged on both sides of a main drive within one axle assembly all of them having one and the same oil filling. From out of this one oil filling, all lubrication and cooling problems must be solved in an axle assembly. From among these difficulties, the cooling requires the more intensive lubricant circulation since breaking action produces a considerable heat amount in the plates of the multi-plate friction type wet brake.

During and after the braking action, the temperature of the thin oil film between the brake plates will be arisen until or over the deterioration temperature limit of the oil. Namely, the high temperature of the oil triggers the distillation procedure of the oil and the bitumen which is one of the side product of this distillation, gets deposited on the surface of the brake plates quite quickly. The organic friction layer on the brake plates gets saturated with bitumen, and these result in the drastical decrease of the friction coefficient between the brake plates. In the end effect, the vehicle cannot be further operated because of the total lack of brake function.

The increased heat within the multi-plate friction type wet brake causes the organic friction layer to get loosened from the steel base plate and/or it gets burned. The removed particles of the friction layer pollutes the lubricant, deteriorate the lubrication effect, cause sediments on gears and bearings.

In case of known axle assemblies (as it is described inter alia in GE patent specification No. 36 38 862), the centrifugal effect of the driving motion of the brake plate is used to make the oil circulation more effective. This solution, however, is suitable to circulate the oil only within the wheel hub and, thus, the amount of oil to be used for cooling is very limited. Therefore, this kind of prior art solutions is able to deflect only a relatively small amount of heat and is not suitable to conduct the heat away, out of the wheel hub. In the practice, this solution is not secure enough since the produced heat amount is often greater than the dissipated one, especially under unfavourable operation conditions of the vehicle. Just under these conditions, it is eminent to have reliable breaking effect.

To provide a reliable heat balance of produced and dissipated heat, it has been proposed (in e.g. GE patent specification No. 23 63 104) to separate the oil chamber of the multi-plate friction type wet brake from the oil chamber of the wheel hub and to provide a separate cooling for the brake plates arranged in a closed chamber from outside. Therein, a separate cooling system operated with water is provided for cooling the brake plates. It is needles to say that this arrangement is very complicated and its operation is troublesome: one has to control the water cooling system tightly separated from the oil circulation system.

SUMMARY OF THE INVENTION

The main objective of the present invention is to provide an axle assembly with a novel lubricant circulation system which lubricates the inner constructional parts of the axle assembly and, at the same time, it cools the multi-plate wet brake and the gear drives securely under all operational conditions of the axle assembly. An important further object is not to increase the complexity of the axle assembly and thus, not to decrease the operational safety of the known axle assemblies.

The basic idea of this invention is to utilize the, whole axle assembly, i.e. its constructional parts as well as the whole oil amount within it, to dissipate the heat amount produced by the multi-plate wet brake and the gears. For this, a suitable pump should be used within the axle assembly to force the lubricant in relatively high amount to the brake plates as well as to the gearings in the wheel hubs and back to the oil chamber of the main drive.

Hence, according to the invention, a driven axle assembly for vehicles has a lubricant circulation system, and the axle assembly comprises:

- an axle housing with a main drive and a lubricant liquid in its inside,
- hollow axle casings fixed to both sides of the axle housing,
- a hollow wheel hub rotatably connected to each axle housing, the wheel hub having a flange for carrying a vehicle wheel rim as well as, in its inside, a planetary gearing and a multi-plate friction type wet brake, the main drive and the planetary gearing as well as the multi-plate wet brake being interconnected with a drive shaft on both sides of the main drive, respectively, and
- means for making a lubricant liquid flow within the axle assembly.

The improvement is in that a rotatably driven lubricant liquid pump is connected with its inlet opening to the lubricant liquid in the axle housing and with its outlet opening to piping means forcing the lubricant liquid to the planetary gearing and the multi-plate wet brake, wherein the lubricant liquid pump is an eccentric pump with lock valve being arranged around the drive shaft, and an eccentric portion of the pump is in a torque transmitting connection to the drive shaft, and the outlet opening of the liquid pump is communicating with a pressure duct provided around the drive shaft in a concentric manner.

Various optional or preferred features are set out in the detailed description forming part of this specification.

Thus, in one exemplified embodiment of this invention, the pressure duct of the lubricant circulation system is formed between the outer surface of the drive shaft and an inner surface of a tube arranged concentrically around the drive shaft, and one end of the tube is sealingly fixed to the outlet opening of the liquid pump and the other end of the, tube is sealingly fixed to an inner bore of the axle casing surrounding the drive shaft. In this case, for the sake of simplicity, the tube and the liquid pump can be made of one-piece.

It is also preferred, according to the invention, that the said pressure duct is formed between the outer surface of the drive shaft and an inner surface of an inner bore of the axle casing surrounding the drive shaft, and the outlet opening of the liquid pump is sealingly fixed to said inner bore of the axle casing. It is a preferably simplified embodiment wherein the stationary casing of the liquid pump is securely fixed to the axle casing and the end of the inner bore of the axle casing neighbouring the liquid pump is formed as the outlet opening of the liquid pump.

A further preferred embodiment is a unit in which the inlet tube interconnecting the inlet opening of the liquid pump and the lubricant liquid in the axle housing is sealingly fixed to this outlet opening.

It is still another preferred embodiment, wherein the lubricant circulation system conveys the lubricant liquid from the liquid pump through the pressure duct partially to brake plates of the wet brake and partially to gears of the planetary gearing and through roller bearings arranged between the axle casing and the wheel hub and further through at least one opening in the axle casing back to the axle housing.

Finally, it is also preferred that an outlet tube is sealingly fixed to each outlet bore in the axle casing terminaling in the lubricant liquid contained in the axle housing.

BRIEF DESCRIPTION OF THE DRAWINGS

Embodiments of this invention will now be described by way of example with reference, to the accompanying drawings, in which.

DETAILED DESCRIPTION OF THE PREFERRED EMBODIMENTS

Figure 1:
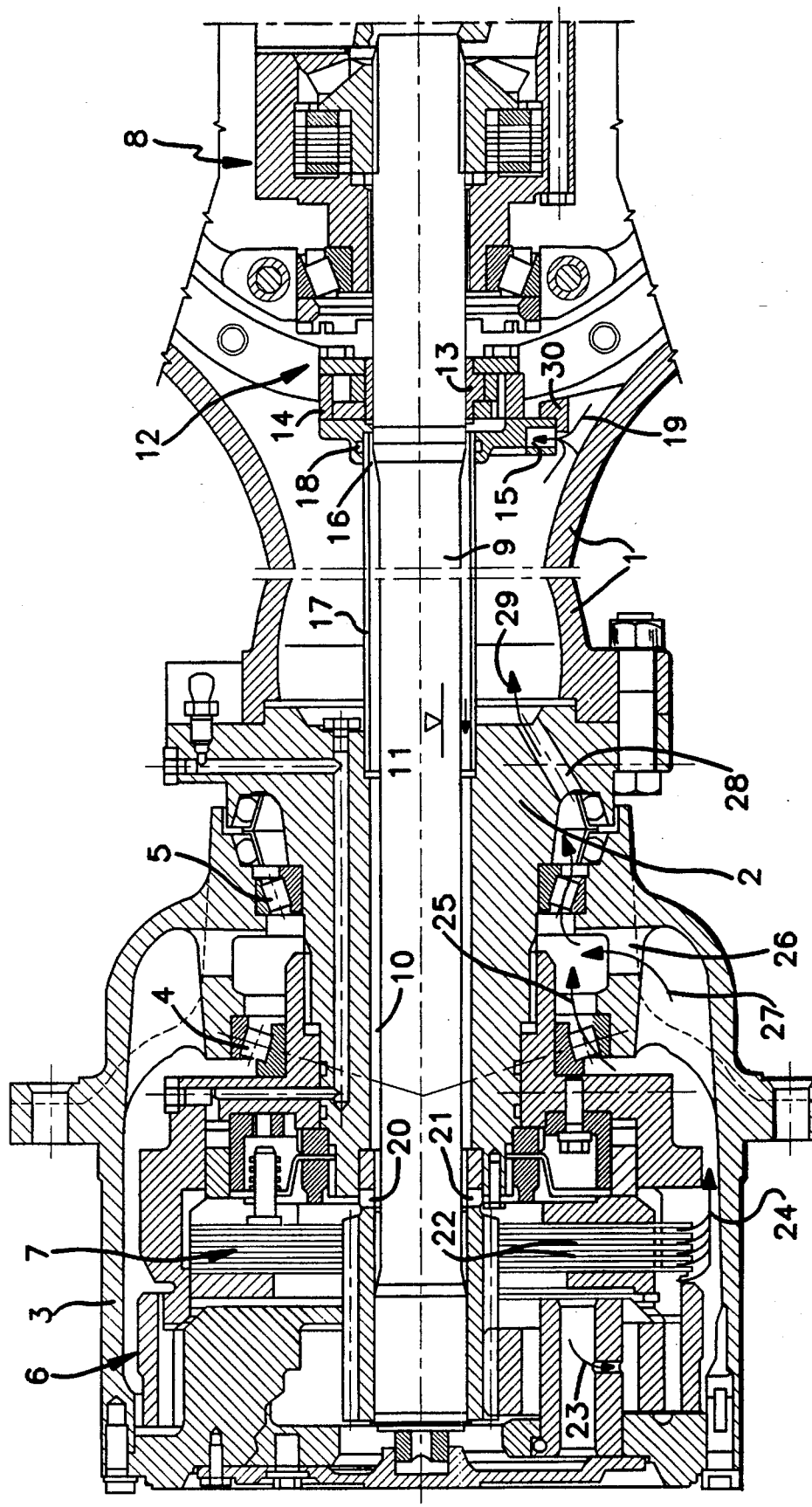
FIG. 1 illustrates a preferred embodiment of the axle assembly as in this invention: a part of a cross sectional view of an axle.

FIG. 1 shows the cross section of a half of art axle assembly; the other half which is symmetrical to a line A—A in FIG. 1 is not shown in the drawing.

In the middle of the axle assembly, an axle housing 1 is arranged onto which a hollow axle casing 2 is firmly fixed on each side of the axle housing 1. On each axle casing 2, a hollow wheel hub 3 is arranged with the aid of roller bearings 4 and 5. The hollow wheel hub 3 contains, among others, a planetary gearing 6 and a multi-plate friction type wet brake 7, the constructional parts and operation of which are described in detail in e.g. UK Patent No. GB 2 227 288.

In the axle housing 1, a main drive 8 is arranged dividing the rotational drive coming from the motor and the gear box (not shown) of the vehicle into two directions, i.e. towards the wheel drives on both sides of the axle housing 1, respectively. For this purpose, the main drive 8 and the planetary gearing 6 and the brake 7 are interconnected with a drive shaft 9 extending out of the inside of the axle housing 1 through a middle bore 10 of the axle casing 2 into the inside of the hollow wheel hub 3. In the axle assembly, a common oil chamber is provided for all constructional parts; a surface level of the lubricant is shown with numeral 11.

In the sense of the invention, a lubricant circulation system is provided in the inside of the axle assembly, the lubricant is forced to flow from the axle housing 1 to the planetary gearing 6 and the multi-plate brake 7 and further back to the axle housing 1. For this, a liquid pump and suitable flow directing means are provided, as it will be clear hereinunder.

In the embodiment of FIG. 1, an eccentric pump 12 with lock valve is arranged around the drive shaft 9. Such kind of eccentric pump is described in details in e.g. U.S. Pat. No. 4,737,089, thus, further description of it is not necessary here. An eccentric portion 13 of the pump 12 is rotated by the drive shaft 9, whilst a casing 14 of the pump 12 is held firmly in place. An inlet opening 15 of the pump 12 is under the oil level 11 of the lubricant in the axle housing 1 and to an outlet opening 16 of the pump 12, a tube 17 is securely fixed, with the intervention of a sealing 18. Other end of the tube 17 is securely fitted into the middle bore 10 of the axle casing 2 which is a non-rotational part. Thus, the casing 14 of the eccentric pump 12 is held in place, too.

In operation, the eccentric pump 12 sucks oil from the oil chamber of the axle housing 1 through its inlet opening 15, as indicated by an arrow 19 and presses this out through its outlet opening 16 into the tube 17 during the rotational motion of the drive shaft 9 and, thus, of the eccentric portion 13. The oil under pressure leaves the tube 17 and enters the middle bore 10 of the axle casing 2. At the other end, the oil leaves the middle bore 10 through openings 20 as indicated by arrows 21. Thus, the lubricant is piped to the planetary gearing 6 and the multi-plate wet brake 7 through the tube 17 and the middle bore 10, in this example.

Now, fresh and cool oil streams in between the brake plates of the multi-plate brake 7 (arrows 22) as well as to the planetary gearing 6 (arrow 23). Here, the oil stream is further expedited by the centrifugal force resulting from rotational movement of the brake plates and of the gears of the planetary gearing 6. The oil enters the rotating parts quite near to the rotational middle point, thus, the centrifugal force can considerably contribute to the extensive through-wash of the brake plates and the gears. The lubricant liquid contacts each brake plate as well as the gears of the planetary gearing 6, thus, it cools them effectively whilst the gears are well lubricated, at the same time.

The warm oil exiting the brake plates and the gears (arrows 24) is thrown against the inner wall of the wheel hub 3 which cools it. Further, the oil flows through the roller bearings 4 and 5 (arrows 25) and, partially, through a bore 26 (arrow 27) in the wheel hub 3, and further through a bore 28 in the axle casing 2 (arrow 29) back to the axle housing 1. Therein, the returning hot oil will be mixed and, thus, cooled by the lubricant contained within the axle housing 1.

As described earlier, the casing 14 of the eccentric pump 12 is held in place by the tube 17. The reaction forces borne by the rotational movement of the eccentric portion 13 of the eccentric pump 12 can also be taken up by providing a seat 30 formed in the inner wall of the axle housing 1. Advantageously, the casing 14 can have an outer form other than a cylindrical one fitting into the seat 30.

It is quite easy to mount the eccentric pump 12. The tube 17 is first to be pushed through the sealing 18 into the outlet opening 16 of the eccentric pump 12 and this as a unit is to be pressed into the middle bore 10 of the axle casing 2 before the main drive 8 and the drive shaft 9 is mounted into the axle assembly.

Figure 2:
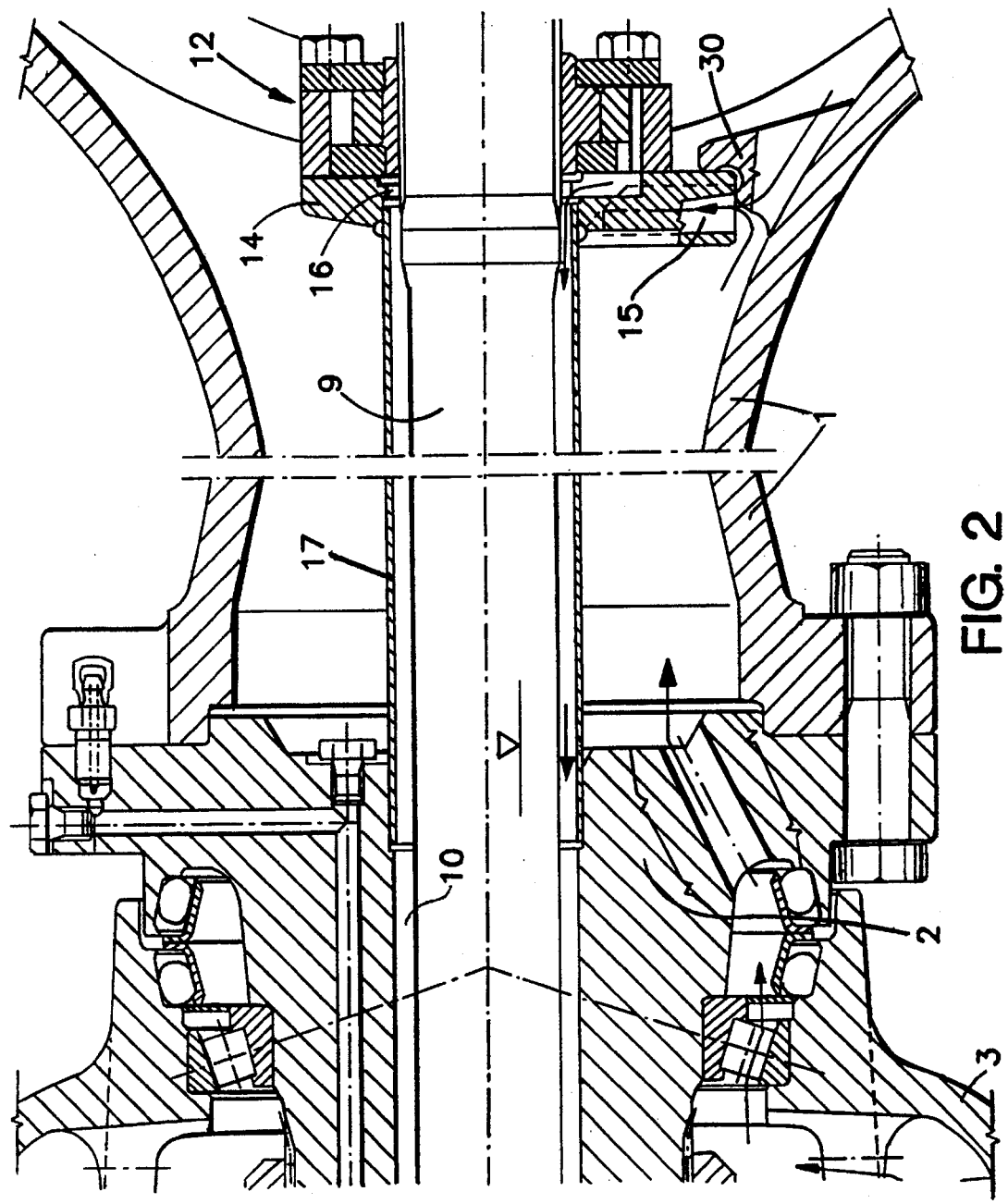
FIG. 2 is a same view as in FIG. 1, however a smaller portion of the cross section of another embodiment.

FIG. 2 illustrates an embodiment, wherein the tube 17 and the eccentric pump 12 are made of one-piece. In the shown example, the tube 17 is welded on the casing 14 of the eccentric pump 12 but, in another case, the tube 17 and the casing 14 can be cast as one piece. All parts shown in this figure are the same as in FIG. 1 and have the same reference numeral, with the only exception of the sealing 18 at the outlet opening 16 of the eccentric pump 12 in FIG. 1, which is unnecessary in the embodiment of FIG. 2. This embodiment is useful when, because of constructional reasons, the main drive 8 is quite near to the wheel drives and, thus, the tube 17 can be relatively short.

Figure 3:
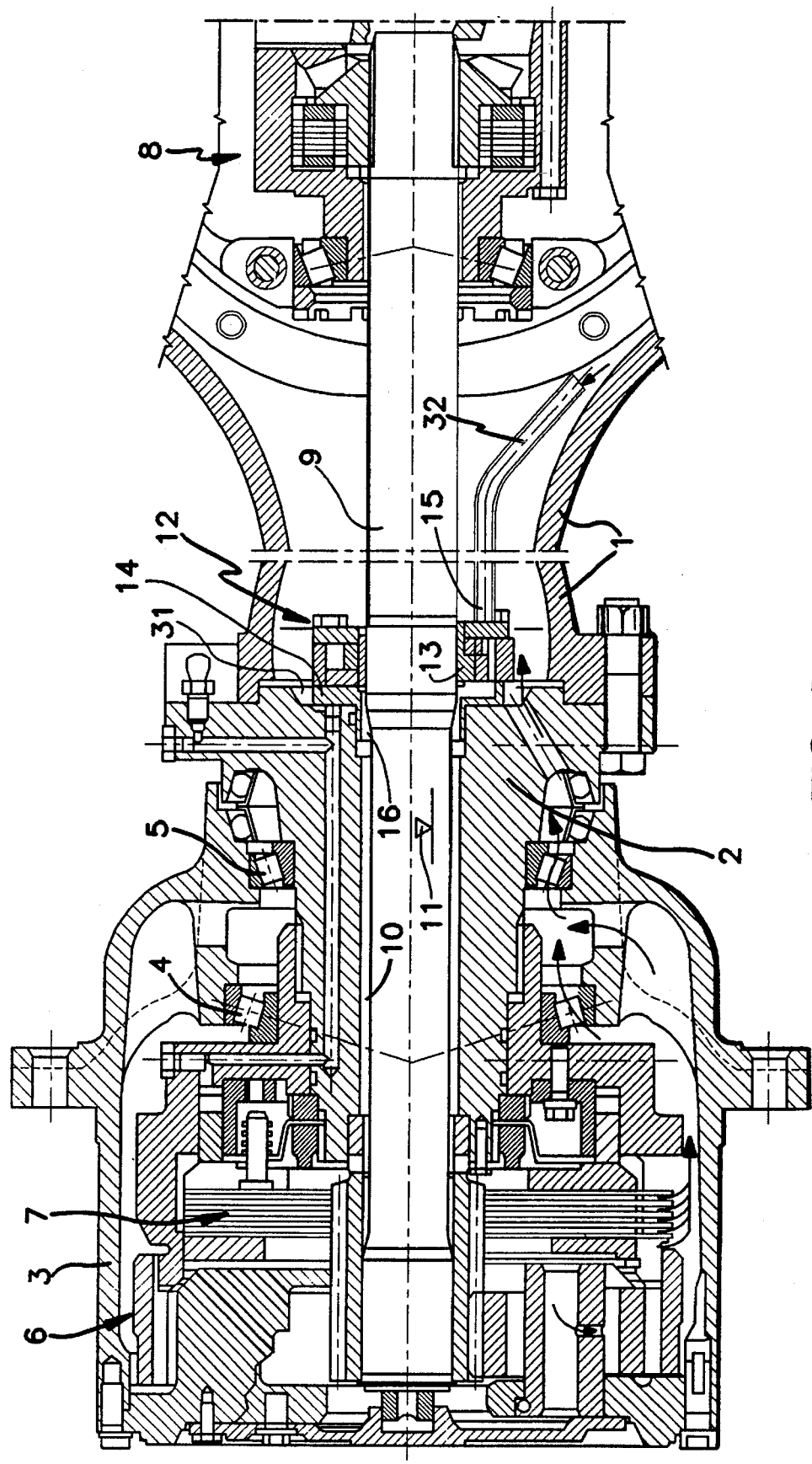
FIG. 3 is a same view as in FIG. 1, however for still another embodiment.

In FIG. 3, the eccentric pump 12 is directly fixed to the axle casing 2. The casing 14 of the eccentric pump 12 is formed at its outlet opening 16 to fit into a seat 31 provided in the end surface of the axle casing 2. The outlet opening 16 mouths here directly into the middle bore 10 and this alone conveys the lubricant to the planetary gearing 6 and the multi-plate wet brake 7. With this, the tube 17 and the sealing 18 as in FIG. 1 can totally be left away. However, it is useful to connect to the inlet opening 15 of the eccentric pump 12 a tube 32 ending in the oil chamber of axle housing 1. With this, it is sure that the greatest portion of the oil will be sucked from the relatively cold oil bath of the axle housing 1.

Figure 4:
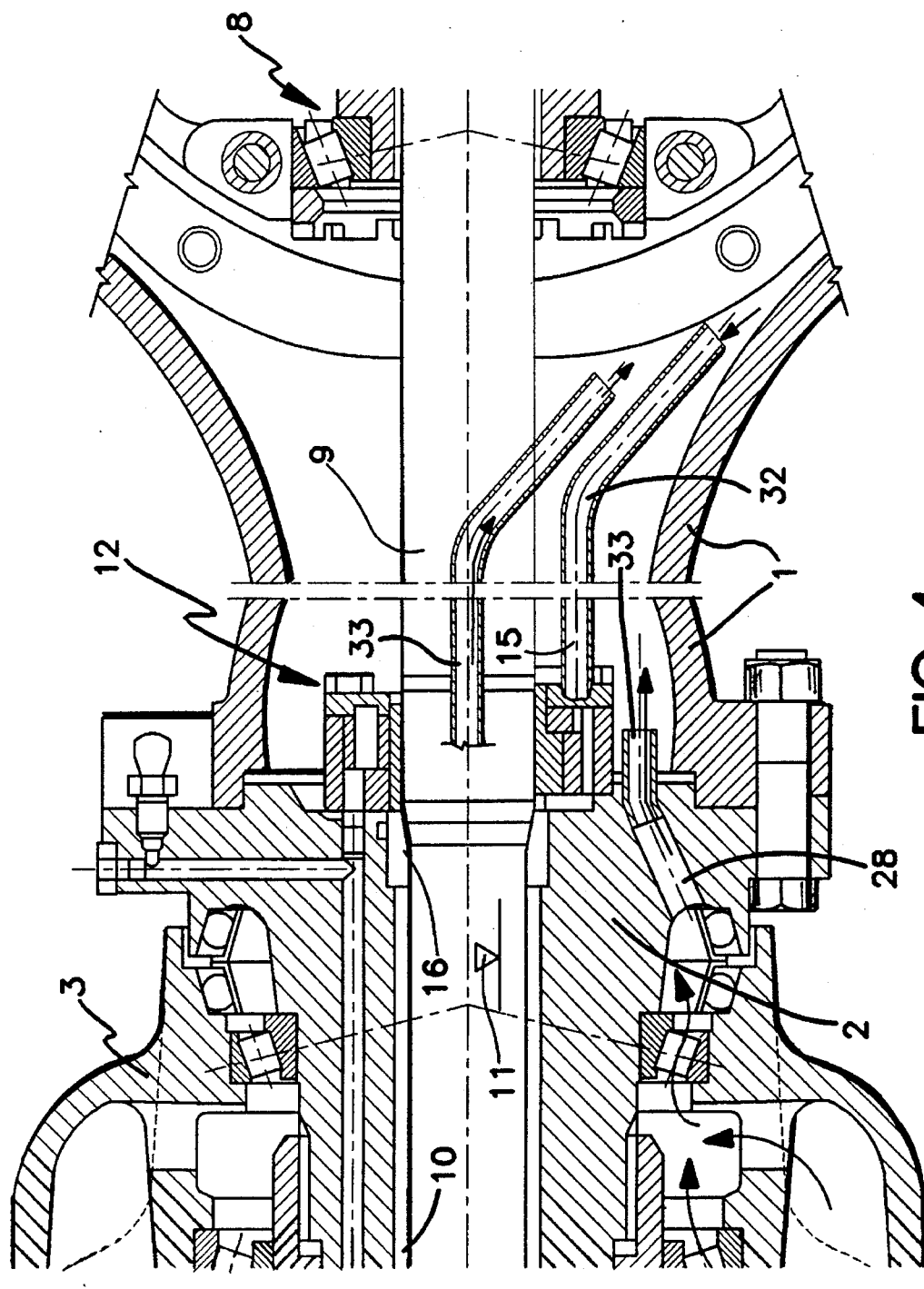
FIG. 4 shows a portion of the cross section of just another embodiment.

In the embodiment of FIG. 4, the axle assembly as in this invention is further simplified. The eccentric pump 12 is still mounted directly on the axle casing 2 but the seat 31 is formed to replace the casing 14 of the eccentric pump 12. With this a minimum of the number of additional constructional parts being necessary to provide the oil stream within the lubricant circulation system is reached.

In FIG. 4, it is also shown that beneath the tube 32 sucking oil from the axle housing 1, further tubes 33 can be provided, which are fixed to the outlet bores 28 conveying the oil back to the oil space in the axle housing 1. With this, a well defined circulation path and good mixture of warm and cold lubricant can be provided.

The most important advantage is apparent in the very simple construction of the arrangement as described. After the axle assembly being filled up with lubricant, the whole apparatus is in operational condition immediately. As is indicated with the oil level 11 in the drawing, the inlet opening 15 as well as a part of the eccentric pump 12 are under the oil level 11, thus the eccentric pump 12 sucks oil at the first rotation of the drive shaft 9. When the oil is changed in the axle assembly, no additional steps are necessary, as if the eccentric pump 12 would not be present within the axle assembly. The very few parts of the whole circulation system do not influence the running of the axle assembly. But the heat developing in the gears of the planetary gearing 6 and, more importantly, in the course of the braking is effectively absorbed by the lubricating oil which streams in much greater quantity than before. The brake effect is surprisingly greater and is not deteriorating under heavy braking. This is a quite important advantage when the security of vehicles and duration of multi-plate brakes and planetary gearings are considered.

We claim:

1. Driven axle assembly for vehicles with a lubricant circulation system, said assembly having an axle housing with a main drive and a lubricant liquid in its inside, hollow axle casings fixed to both sides of the axle housing, a hollow wheel hub rotatably connected to each axle housing, the wheel hub having a flange for carrying a vehicle wheel rim as well as, in its inside, a planetary gearing and a multi-plate friction type wet brake, the main drive and the planetary gearing as well as the multi-plate wet brake being interconnected with a drive shaft on both sides of the main drive, respectively, means for making a lubricant liquid flow within the axle assembly, said means for lubricant liquid flow being a rotatably driven lubricant liquid pump, which is connected with its inlet opening to the lubricant liquid in the axle housing and with its outlet opening to piping means forcing the lubricant liquid to the planetary gearing and the multi-plate wet brake, the lubricant liquid pump being in a torque transmitting connection to the drive shaft, and the outlet opening of the liquid pump communicating with a pressure duct provided around the drive shaft in a concentric manner, wherein said pressure duct is formed between the outer surface of the drive shaft and an inner surface of a tube arranged concentrically around the drive shaft, and one end of the tube is sealingly fixed to the outlet opening of the liquid pump and the other end of the tube is sealingly fixed to a middle bore of the axle casing surrounding the drive shaft.

2. Axle assembly as claimed in claim 1, wherein said tube and the liquid pump are made of one-piece.

3. Axle assembly as claimed in claim 1, wherein said lubricant circulation system conveys the lubricant liquid from the liquid pump through the pressure duct partially to brake plates of the multi-plate brake and partially to gears of the planetary gearing and through roller bearings arranged between the axle casing and the wheel hub and further through at least one outlet bore in the axle casing back to the axle housing.

4. Axle assembly as claimed in claim 3, wherein an outlet tube is sealingly fixed to each outlet bore in the axle casing terminaling in the lubricant liquid contained in the axle housing.

5. Axle assembly as claimed in claim 1, wherein said lubricant liquid pump is an eccentric pump with lock valve arranged around the drive shaft, and an eccentric portion of the pump is in a torque transmitting connection to the drive shaft.

6. Driven axle assembly for vehicles with a lubricant circulation system, said assembly having an axle housing with a main drive and a lubricant liquid in its inside, hollow axle casings fixed to both sides of the axle housing, a hollow wheel hub rotatably connected to each axle housing, the wheel hub having a flange for carrying a vehicle wheel rim as well as, in its inside, a planetary gearing and a multi-plate friction type wet brake, the main drive and the planetary gearing as well as the multi-plate wet brake being interconnected with a drive shaft on both sides of the main drive, respectively, means for making a lubricant liquid flow within the axle assembly, said means for lubricant liquid flow being a rotatably driven lubricant liquid pump, which is connected with its inlet opening to the lubricant liquid in the axle housing and with its outlet opening to piping means forcing the lubricant liquid to the planetary gearing and the multiplate wet brake, the lubricant liquid pump being in a torque transmitting connection to the drive shaft, and the outlet opening of the liquid pump communicating with a pressure duct provided around the drive shaft in a concentric manner, wherein said pressure duct is formed between the outer surface of the drive shaft and an inner surface of a middle bore of the axle casing surrounding the drive shaft, and the outer opening of the liquid pump is sealingly fixed to said middle bore of the axle casing.

7. Axle assembly as claimed in claim 6, wherein a stationary casing of the liquid pump is securely fixed to the axle casing and the end of the middle bore of the axle casing neighbouring the liquid pump is formed as the outlet opening of the liquid pump.

8. Axle assembly as claimed in claim 6, wherein an inlet tube is sealingly fixed to the inlet opening of the liquid pump communicating with the lubricant liquid in the axle housing.

9. Axle assembly as claimed in claim 6, wherein said lubricant liquid pump is an eccentric pump with lock valve arranged around the drive shaft, and an eccentric portion of the pump is in a torque transmitting connection to the drive shaft.

* * * * *

UNITED STATES PATENT AND TRADEMARK OFFICE
CERTIFICATE OF CORRECTION

PATENT NO.   : 5,535,850
DATED        : July 16, 1996
INVENTOR(S)  : Lorant TAR et al.

It is certified that error appears in the above-identified patent and that said Letters Patent is hereby corrected as shown below:

On the title page:

In Item [75] Inventor: change the third inventor's surname from "Iibor" to --Tibor--.

Signed and Sealed this

Eighth Day of October, 1996

Attest:

BRUCE LEHMAN

*Attesting Officer*     *Commissioner of Patents and Trademarks*